(12) United States Patent
Paruchuri et al.

(10) Patent No.: US 10,358,931 B2
(45) Date of Patent: Jul. 23, 2019

(54) AEROFOIL

(71) Applicant: Rolls-Royce plc, London (GB)

(72) Inventors: Chaitanya Paruchuri, Southampton (GB); Philip Joseph, Southampton (GB); Jae-Wook Kim, Southampton (GB)

(73) Assignee: ROLLS-ROYCE plc, London (GB)

( * ) Notice: Subject to any disclaimer, the term of this patent is extended or adjusted under 35 U.S.C. 154(b) by 283 days.

(21) Appl. No.: 15/415,498

(22) Filed: Jan. 25, 2017

(65) Prior Publication Data

US 2017/0241278 A1 Aug. 24, 2017

(30) Foreign Application Priority Data

Feb. 19, 2016 (GB) .................. 1602895.3

(51) Int. Cl.
*F01D 9/04* (2006.01)
*B64C 3/14* (2006.01)
(Continued)

(52) U.S. Cl.
CPC ............... *F01D 9/041* (2013.01); *B63H 1/26* (2013.01); *B64C 3/14* (2013.01); *B64C 11/18* (2013.01); *F01D 5/141* (2013.01); *F04D 29/324* (2013.01); *F04D 29/544* (2013.01); *F04D 29/681* (2013.01); *B64C 2003/148* (2013.01); *F05D 2240/121* (2013.01); *F05D 2240/303* (2013.01); *F05D 2250/11* (2013.01); *F05D 2250/182* (2013.01); *F05D 2250/183* (2013.01); *F05D 2250/184* (2013.01); *F05D 2250/70* (2013.01); *F05D 2260/96* (2013.01); *Y02T 50/12* (2013.01); *Y02T 50/673* (2013.01)

(58) Field of Classification Search
CPC . F01D 5/14; F01D 5/141; F01D 5/147; F01D 9/041; F03B 3/121; F04D 29/324; F04D 29/384; B64C 11/18; B64C 3/14; B63H 1/26
See application file for complete search history.

(56) References Cited

U.S. PATENT DOCUMENTS 5,088,665 A * 2/1992 Vijgen .................... B64C 23/06
244/198
5,386,955 A * 2/1995 Savill ....................... B63B 1/34
138/38
(Continued)

FOREIGN PATENT DOCUMENTS

DE 102006043462 A1 3/2008
GB 2105791 A 3/1983
(Continued)

OTHER PUBLICATIONS

Apr. 10, 2017 Extended European Search Report issued in Patent Application No. 17152955.5.
(Continued)

*Primary Examiner* — David E Sosnowski
*Assistant Examiner* — Brian P Wolcott
(74) *Attorney, Agent, or Firm* — Oliff PLC

(57) ABSTRACT

An aerofoil component defines an in use leading edge and a trailing edge. The leading edge has at least one serration defining an apex and a nadir. The leading edge has a generally chordwise extending slot located at the nadir of each serration.

14 Claims, 9 Drawing Sheets

(51) Int. Cl.
*B64C 11/18* (2006.01)
*B63H 1/26* (2006.01)
*F01D 5/14* (2006.01)
*F04D 29/32* (2006.01)
*F04D 29/68* (2006.01)
*F04D 29/54* (2006.01)

(56) References Cited

U.S. PATENT DOCUMENTS

| | | | | |
|---|---|---|---|---|
| 5,603,607 | A * | 2/1997 | Kondo | F04D 29/384 |
| | | | | 415/119 |
| 6,431,498 | B1 | 8/2002 | Watts et al. | |
| 6,733,240 | B2 * | 5/2004 | Gliebe | F01D 5/141 |
| | | | | 416/228 |
| 7,909,576 | B1 | 3/2011 | van der Bos et al. | |
| 8,794,927 | B2 * | 8/2014 | Vassilicos | F15D 1/10 |
| | | | | 416/228 |
| 2009/0074585 | A1 * | 3/2009 | Koegler | F03D 1/0675 |
| | | | | 416/228 |
| 2011/0058955 | A1 | 3/2011 | Jung et al. | |
| 2011/0142637 | A1 * | 6/2011 | Riddell | F03D 1/0633 |
| | | | | 416/62 |
| 2013/0164488 | A1 * | 6/2013 | Wood | F04D 29/324 |
| | | | | 428/80 |

FOREIGN PATENT DOCUMENTS

| | | |
|---|---|---|
| JP | 2000/161296 | 6/2000 |
| JP | 2006/009699 A | 1/2006 |
| WO | 2006/042401 A1 | 4/2006 |
| WO | 2012/062249 A1 | 5/2012 |
| WO | 2013/092368 A1 | 6/2013 |
| WO | 2014/048437 A1 | 4/2014 |

OTHER PUBLICATIONS

Jun. 7, 2018 Office Action issued in European Application No. 17152955.5.
Gruber et al., "Noise Reduction using Combined Trailing Edge and Leading Edge Serrations in a Tandem Airfoil Experiment", AIAA Inc., pp. 1-22, 2012.
Jul. 13, 2016 Search Report issued in British Patent Application No. 1602895.3.

* cited by examiner

AEROFOIL

The present disclosure concerns an aerofoil, particularly but not exclusively, an aerofoil for a gas turbine engine having a reduced broadband noise profile in use.

Noise from aircraft is an ongoing environmental concern. There are typically several sources of noise from an aircraft, including jet noise produced by shear interaction between the jet exhaust from gas turbine engines, and aerodynamic noise caused primarily by turbulent air created by the flow of air over aircraft surfaces.

As aircraft engine bypass ratios are increased, aircraft aerodynamic noise is becoming a relatively large contributor to overall aircraft noise. In particular, turbulence created on the leading and trailing edges of aerofoil surfaces is thought to produce a significant proportion of noise produced by an aircraft. Noise created by these mechanisms often has a wide range of frequencies (known as "broadband noise"), and is particularly difficult to eliminate.

Examples of aerofoils on aircraft include the wings and tail surfaces, as well as smaller components such as control surfaces and high lift devices such as flaps and slats. The gas turbine engines of the aircraft also typically include several aerofoils, including compressor and turbine rotors and stators, fan rotors and Outlet Guide Vanes (OGV). The gas turbine engine nacelle is also typically aerofoil shaped.

It has been proposed to provide wave-like projections on the leading edge of an aerofoil, as proposed for example in U.S. Pat. No. 6,431,498. It is thought that such projections reduce drag as well as reduce noise to some extent, as evidenced for example in US2013164488. Such projections have been proposed for both fixed and rotating aerofoils, as proposed for example in US2011058955. However, such projections do not eliminate noise completely, and it is therefore desirable to provide an aerofoil having improved noise attenuation properties.

The term "chord" will be understood to refer to the distance between the leading and trailing edge of an aerofoil, measured parallel to the normal in use airflow over the wing. The term "chordal" will be understood to refer to a direction parallel to the chord. The term "span" will be understood to refer to a direction generally normal to the chord, extending between a root and a tip of an aerofoil component.

According to a first aspect of the disclosure there is provided an aerofoil component defining an in use leading edge and a trailing edge, the leading edge comprising at least one serration defining an apex and a nadir, wherein the leading edge comprises a generally chordwise extending slot located at the nadir of each serration.

Advantageously, it has been found that the disclosed aerofoil leading edge profile provides reduce broadband noise when in use compared to prior arrangements.

Each serration may comprise, in sequence in a spanwise direction extending from the apex, a rearwardly inclined relative to an in use flow direction first portion, a rearwardly inclined second portion joined with the first portion at a first internal angle relative to the first portion of between 90° and 180°, a forwardly inclined relative to the in use flow direction third portion, and a forwardly inclined fourth portion joined with the third portion at a second internal angle relative to the third portion of between 90° and 180°.

The first and/or fourth portion may comprise an angle relative to the in use flow direction between 45° and 90°, and may comprise an angle greater than 50°.

The first portion of a first serration may be joined to a fourth portion of a second serration to form the apex. Alternatively, the first portion of a first serration may be joined to a fourth portion of a second serration via a sixth portion, The sixth portion may extend generally normally to the in use flow direction.

The second portion may be joined to the third portion to form the slot. Alternatively, the second and third portions may be joined to one another by a fifth portion, the second, third and fifth portions defining the slot. The fifth portion may extend in a generally spanwise direction, generally normal to the in use flow direction. A spanwise length of the fifth portion may be at least 1 mm. At least one of the second and third portions may extend generally parallel to the in use flow direction.

At least one of the first, second, third and fourth portions may comprise a convex curve, and may comprise a section of a sinusoidal curvature. Alternatively, at least one of the first, second, third and fourth portions may comprise a straight edge.

The waveform may comprise a sinusoidal wave.

A chordwise distance between the apex and the nadir of each serration may be at least twice the spanwise distance between apexes of adjacent serrations.

The aerofoil component may comprise an aerofoil of a gas turbine engine, such as an outlet guide vane (OGV).

According to a second aspect of the present disclosure there is provided a gas turbine engine comprising an aerofoil component in accordance with the first aspect of the present disclosure.

According to a third aspect of the present disclosure there is provided an aircraft comprising an aerofoil component in accordance with the first aspect of the present disclosure.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
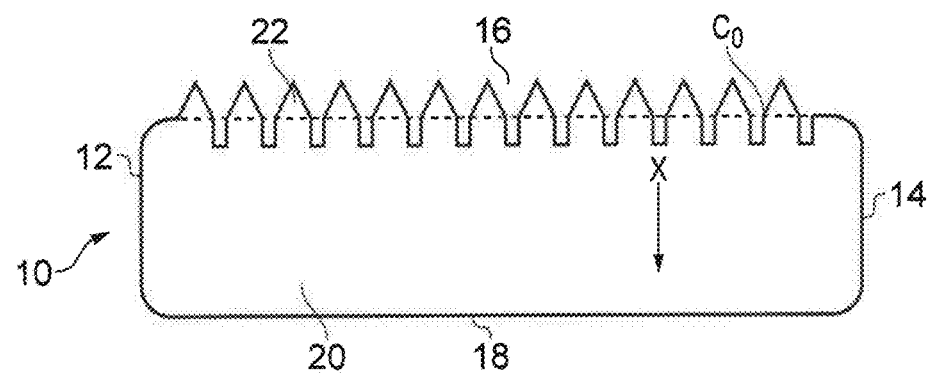
FIG. 1 is a plan view of a first aerofoil in accordance with the present invention.

FIG. 1 shows a first aerofoil 10 in accordance with the present disclosure. The aerofoil 10 defines a root 12, a tip 14, a leading edge 16, a trailing edge 18, a suction surface 20 and a pressure surface (not shown) on the opposite side to the suction surface 20. The aerofoil 10 defines a mean chord line $C_0$ defined by a line extending from the root 12 to the tip 14 of the aerofoil 10 along the arithmetic mean of the position of the leading edge 16 of the aerofoil 10. The aerofoil 10 defines an in use flow direction X extending in a direction extending from the leading edge 16 to the trailing edge 18.

The leading edge 16 of the aerofoil 10 has a serrated profile defined by a plurality of generally forwardly extending chordwise serrations 22. The serrations are shown in further detail in FIG. 2, which shows the leading edge 16 of the aerofoil 10.

Each serration 22 comprises an apex 24 and a nadir 25. At the nadir 25 is located a generally chordwise extending slot 36. A single slot is provided at the nadir of each serration 22, with no other slots being present in the portion of the leading edge profile defined by the serrations 22.

Figure 2:
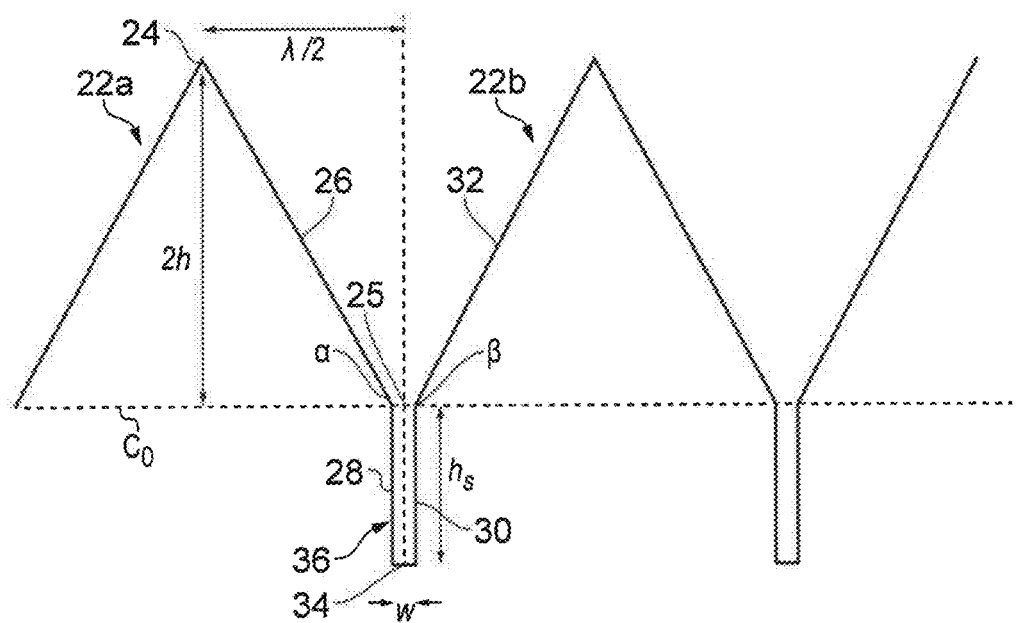
FIG. 2 is a schematic plan view of a leading edge of the aerofoil of FIG. 1.

The plan profile (i.e. the projection of the leading edge 16 when viewed from either the suction surface 20 or pressure surface) of the aerofoil 10 is defined by an undulating profile defining the plurality of serrations 22a, 22b, etc as shown in FIG. 2. Each serration 22 is defined by, in sequence in a spanwise direction (i.e. in a direction extending from the root 12 to the tip 14), an apex 24, a rearwardly inclined relative to an in use flow direction first portion 26, a rearwardly inclined second portion 28 joined with the first portion 26 at a first internal angle α relative to the first portion 26, a forwardly inclined relative to the in use flow direction third portion 30, and a forwardly inclined relative to the in use flow direction fourth portion 32 joined with the third portion 30 at a second internal angle β relative to the third portion. Each of the first and second internal angles α, β are between 90 and 180° in all embodiments, though in the specific example shown in FIGS. 1 and 2, the internal angles α, β are approximately 50°. The internal angles α, β form sharp corners, which act as a source of noise.

The second and third portions 28, 30 extend in a direction generally parallel to the in use flow direction X, and are joined by a generally normal to the in use flow direction extending fifth portion 34. A chordal distance between the apex 24 and the nadir (i.e. the join between the first and second portions 26, 28) defines a serration height $2h$. The spanwise distance (i.e. in a direction normal to the in use flow direction X) between apexes 24 of adjacent serrations 22a, 22b defines a wavelength λ.

The second portion 28, third portion 30 and fifth portion 34 define a slot generally indicated at 36 having a characteristic width w in a direction normal to the in use flow direction X defined by the gap between the second and third portions 28, 30. The slot 36 has a characteristic slit height $h_s$ in the chordwise direction from the nadir (i.e. the join between the first and second regions 26, 28), and the fifth region 34.

Overall serration length ($2h+h_s$, between the apex 24 and the fifth region 34 of the slot 36) is a factor that determines noise control effectiveness at low frequencies. From experiments, it has been found that greatest noise control effectiveness is achieved when then ratio of serration amplitude $2h$ to the serration wavelength λ is greater than 2. In this case the total serration length ($2h+h_s$) needed to provide at least 3 dB noise reduction above a certain frequency $f_0$ is approximately $$2h+h_s=U/2f_0$$

Where U represents oncoming freestream flow velocity at the leading edge in the chordwise direction. In one example, where the leading edge comprises an OGV 10 (described in further detail below), oncoming freestream flow velocity will be of the order of 150 to 250 meters per second. Consequently, for a target noise reduction frequency of greater than 1000 Hz (approximately 1 BPF), a total serration height of at least 8 cm must be used in order to provide a greater than 3 dB noise reduction. More modest noise reductions can be achieve with shorter serrations heights.

Experimental results have been obtained from aerofoils having the characteristics described above with reference to FIG. 2. In a first experimental series, ten 2 mm thick flat plates A-J were provided having the above described plan profile. The leading edge of each plate A-J had a plurality of serrations, each having a chordal length $c_0$ (i.e. the distance between the leading and trailing edges at the mean chord) or 150 mm. Table 1 tabulates the dimensions of each plate A-J in terms of the mean chord $c_0$. For comparison purposes, similar experiments were performed on a first control flat plate 1 having a straight leading edge, a second control flat plate 2 having a saw-tooth leading edge, but not having the slits, and a third control plate 3 having a sinusoidal leading edge profile, but also lacking slits.

TABLE 1

|   | $c_0$ | $h/c_0$ | $λ/c_0$ | $h_s/c_0$ | $w/λ$ |
|---|---|---|---|---|---|
| A | 150 mm | 0.1 | 0.1 | 0.033 | 0.13 |
| B | 150 mm | 0.1 | 0.1 | 0.066 | 0.13 |
| C | 150 mm | 0.1 | 0.1 | 0.1 | 0.13 |
| D | 150 mm | 0.1 | 0.1 | 0.066 | 0.067 |
| E | 150 mm | 0.1 | 0.1 | 0.066 | 0.2 |
| F | 150 mm | 0.1 | 0.1 | 0.066 | 0.267 |
| G | 150 mm | 0.1 | 0.1 | 0.066 | 0.33 |
| H | 150 mm | 0.033 | 0.033 | 0.1 | 0.13 |
| I | 150 mm | 0.033 | 0.1 | 0.1 | 0.13 |
| J | 150 mm | 0.033 | 0.2 | 0.1 | 0.13 |
| Control 1 | 150 mm | 0 | 0 | 0 | 0 |
| Control 2 | 150 mm | 0.1 | 0.1 | 0 | 0 |
| Control 3 | 150 mm | 0.1 | 0.1 | 0 | 0 |

Each plate was subjected to airflow in a wind tunnel, which was directed to the leading edge such that air flowed over the plate in the in use flow direction. Results were obtained for several different airspeeds. Noise produced by the aerofoils was detected by microphones, and the noise spectrum analysed by Fourier analysis.

Figure 8:
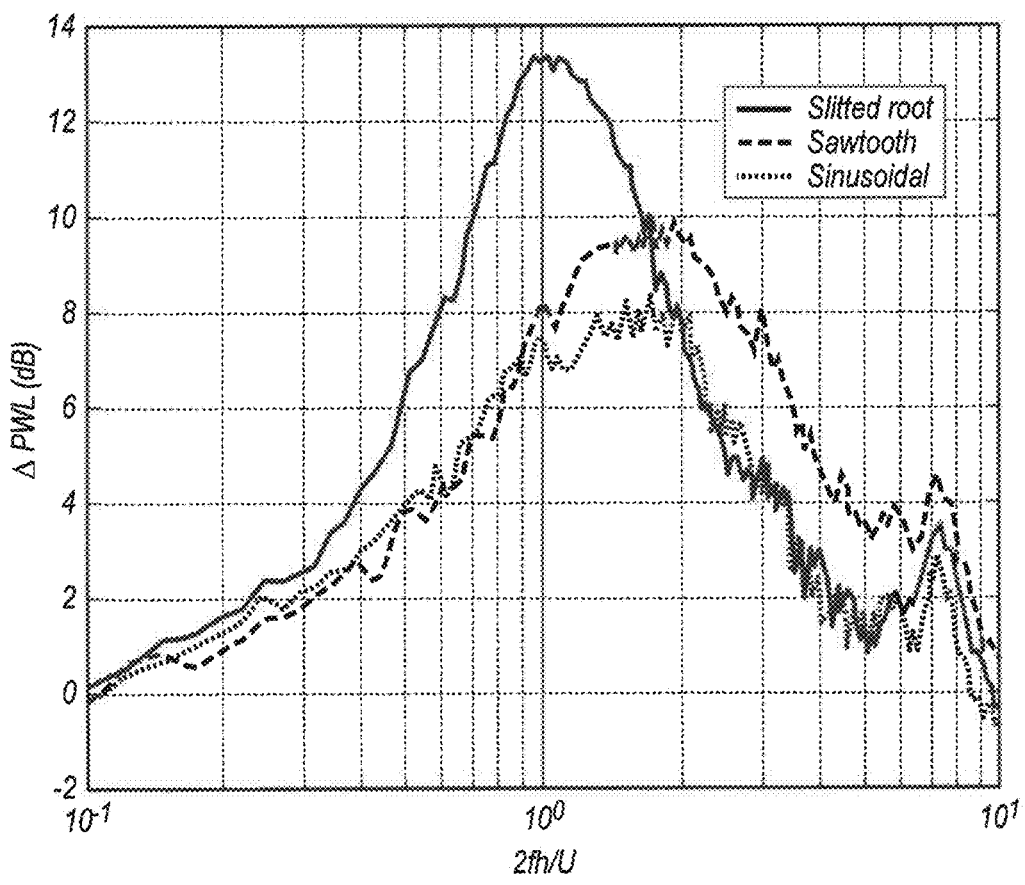
FIG. 8 is a graph showing relative reductions in perceived sound levels of the aerofoil of FIG. 1, in comparison to prior aerofoils, normalised for an aerofoil having a straight leading edge.

FIG. 8 shows experimental results for control plates 2 and 3 and plate B normalised related to results from control plate 1. As can be seen, plate B provides a reduction in perceived noise level (ΔPWL) relative to any of the control plates 1, 2, 3 over a wide range of frequencies of between approximately 100 Hz and 4 kHz.

Figure 9:
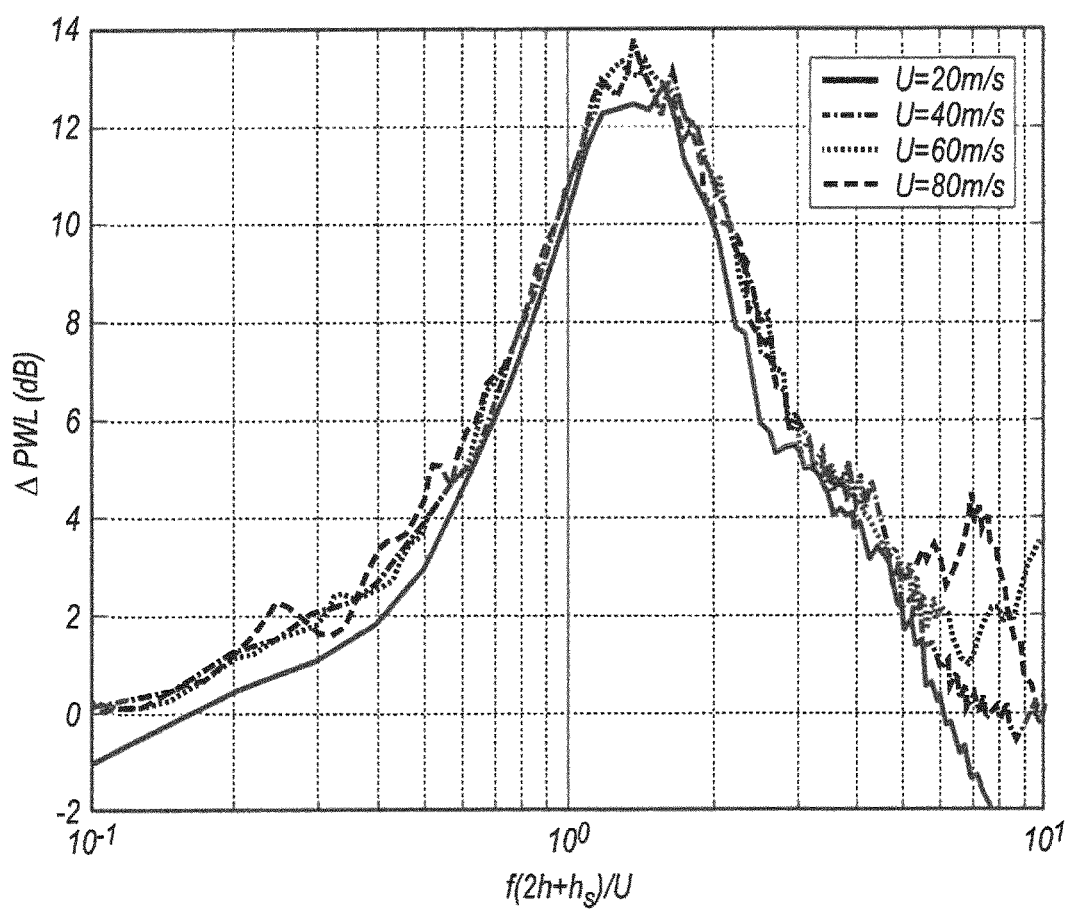
FIG. 9 is a graph showing relative reductions in perceived sound levels of the aerofoil of FIG. 1 at various airstream velocities normalised for an aerofoil having a straight leading edge.

FIG. 9 shows experimental results for plate B at various incoming airflow velocities varying between 20 and 80 m/s, which represents the highest airflow velocities achievable using the wind tunnel available to the inventors. As can be seen, the noise reduction relative to control plate 1 is effective across at a wide variety of incoming airflow velocities.

Figure 10:
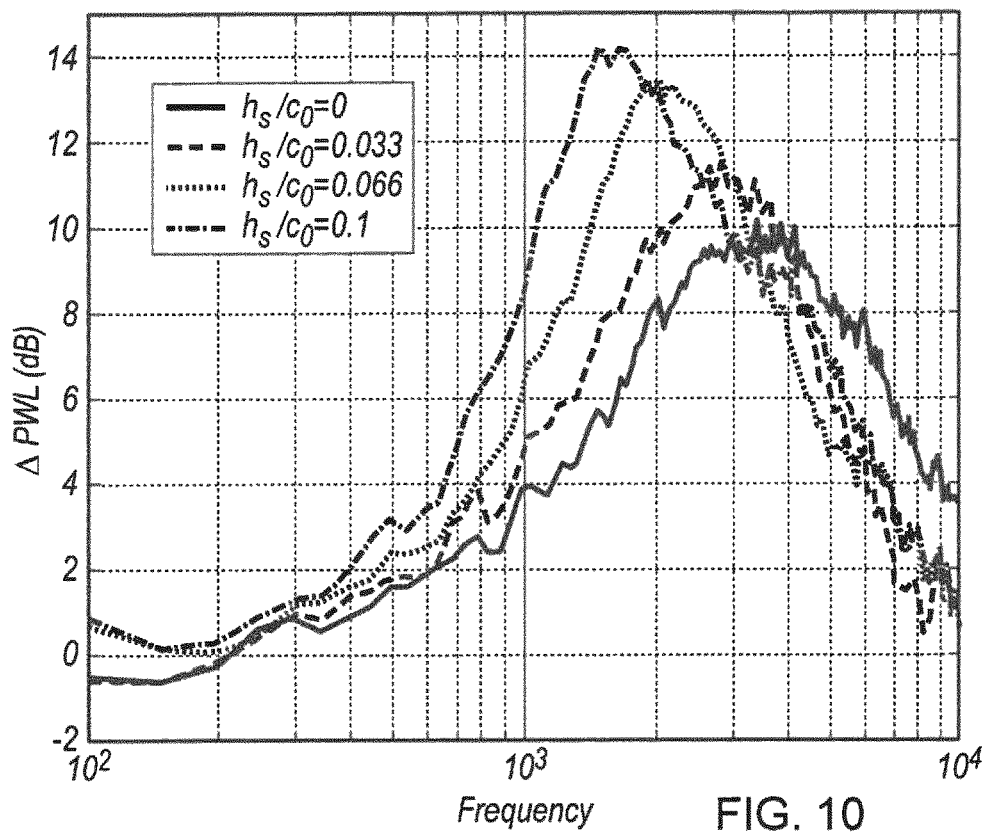
FIG. 10 is a graph showing relative reductions in perceived sound levels of the aerofoil of FIG. 1 having various root heights normalised for an aerofoil having a straight leading edge.

FIG. 10 shows experimental results for plates A to C and control plate 2 relative to control plate 1. As can be seen, greater noise reduction is achieved as slit height is increased relative to the chordal length. It will be understood however that a compromise must be achieved in terms of structural strength and aerodynamic performance relative to noise reduction.

Figure 11:
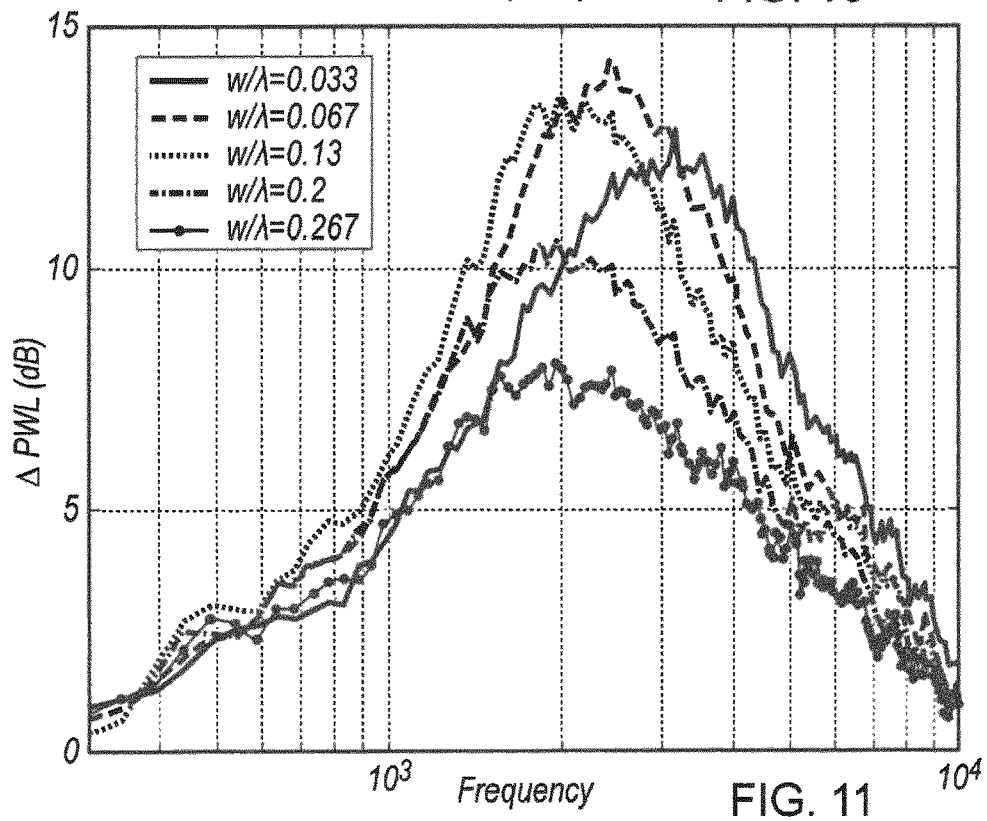
FIG. 11 is a graph showing relative reductions in perceived sound levels of the aerofoil of FIG. 1 having various root widths normalised for an aerofoil having a straight leading edge.

FIG. 11 shows experimental results for various plates relative to control plate 1. As can be seen, greater noise reduction is achieved as slit width is reduced relative to the apex to apex distance λ. It has been found from experiments that a slot width of 1 mm provides optimum noise reduction. An embodiment of the invention having a slot width of 0.5 mm was tested, and is shown in FIG. 10 (as the curve having $h_s/c_O$ of 0.033). As can be seen, the sound attenuation properties of a slot having a width less than 1 mm is reduced at frequencies below 2 kHz, which are particularly important for perceived noise attenuation.

Figure 15:
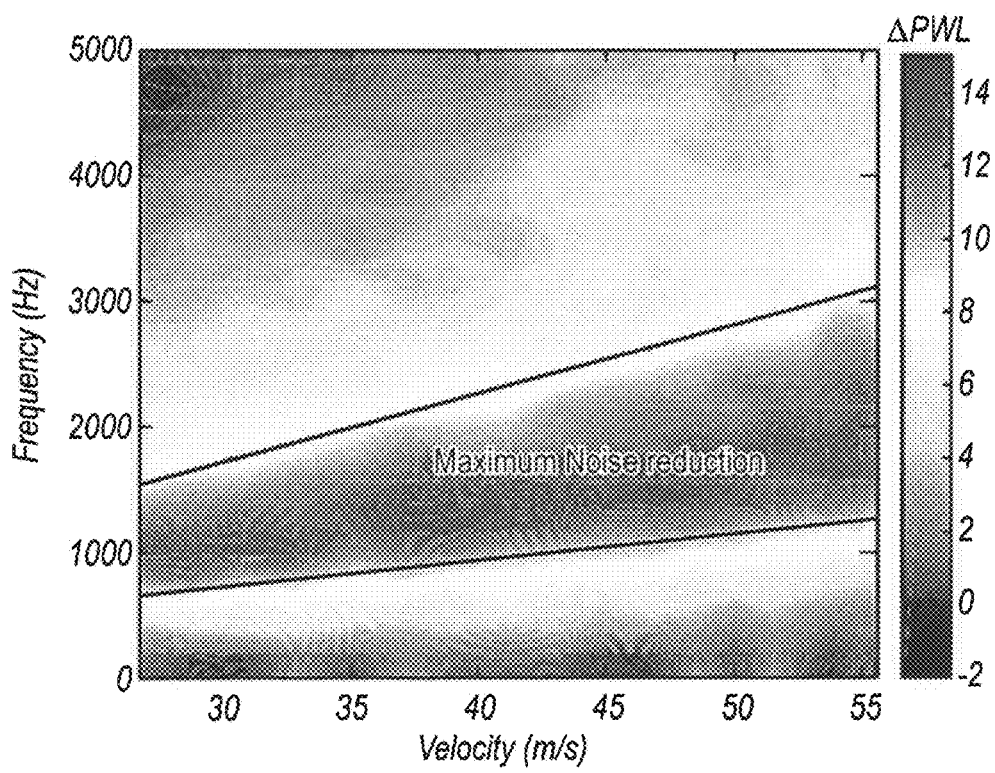
FIG. 15 is a graph showing relative reductions in perceived sound levels of the aerofoil of FIG. 1 at various frequencies and airflow velocities.

FIG. 15 shows noise reduction of plate B relative to control plate 1 plotted against velocity and frequency. As can be seen, maximum noise reduction is provided in a frequency band of approximately 800 Hz to 1500 Hz at velocities below approximately 30 m/s, increasing to between 1000 Hz to 3000 Hz as velocity is increased to 55 m/s.

From these results, several observations can be made:
1. The leading edge profile of the present disclosure provides superior noise reduction compared to prior leading edge profiles.
2. For low frequencies, the noise reduction is a function of $f.h_{eff}/U$, where $h_{eff}$ is the total height of the serrations (i.e. $2h+h_s$) as shown in FIG. 9.
3. The frequency $f_{max}$ at which maximum noise reduction occurs is nearly proportional to mean jet velocity, as demonstrated by FIG. 11. Where the aerofoil comprises an OGV, typical oncoming air velocity during low speed, low engine power operation (such as during approach for landing) will be approximately 200 m/s. Consequently, the peak noise reduction will be provided for frequencies of approximately 1000 Hz. Noise at these frequencies is within the range of normal human hearing, and so noise reductions at these frequencies are particularly desirable.
4. $f_{max}$ decreases as the reciprocal of the slit height $h_s$, as shown in FIG. 8.
5. In general, smaller slit widths w provide greater noise reductions.

Figure 3:
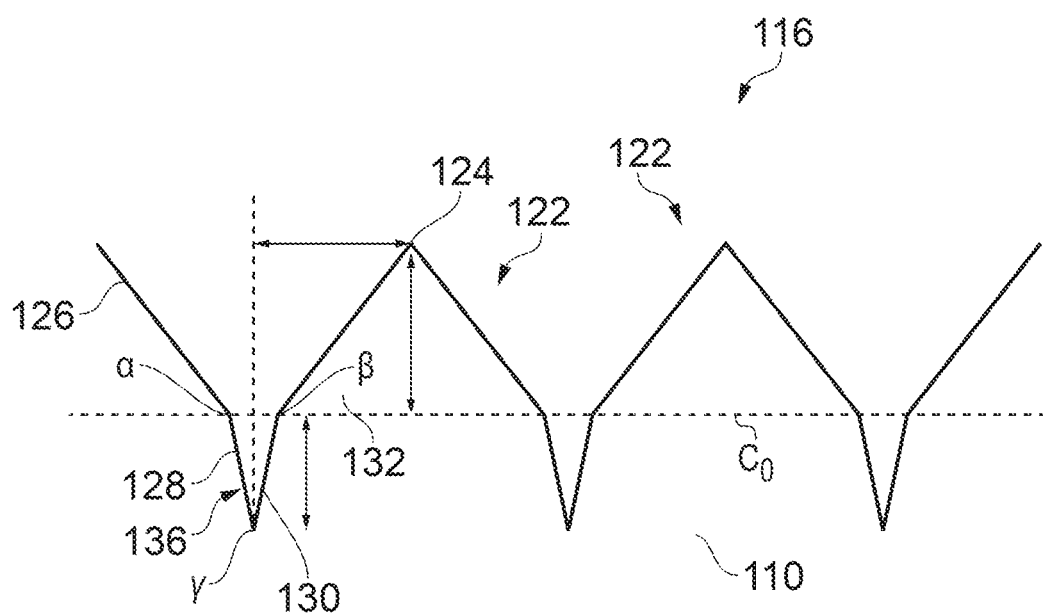
FIG. 3 is a schematic plan view of a leading edge of a second aerofoil in accordance with the present invention.

FIG. 3 shows a second leading edge 116 of a second aerofoil 110 in accordance with the present disclosure. The leading edge 116 again comprises a plurality of serrations 122. Each serration 122 is defined by, in sequence in a spanwise direction, an apex 124, a rearwardly inclined relative to an in use flow direction first portion 126, a rearwardly inclined second portion 128 joined with the first portion 126 at a first internal angle α relative to the first portion 126, a forwardly inclined relative to the in use flow direction third portion 130, and a forwardly inclined relative to the in use flow direction fourth portion 132 joined with the third portion 130 at a second internal angle β relative to the third portion. This embodiment differs from the first embodiment, in that the internal angles α, β are approximately 60°, such that the second and third portions 128, 130 extend at an angle to the in use flow direction. Furthermore, the fifth portion is omitted, and the second and third portions 128, 130 are joined together at an angle γ to form the slit 136. Furthermore, the fifth portion is omitted, and the second and third portions 128, 130 are joined together at an angle γ to form the slit 136. Again, a slit height $h_s$, wavelength λ and serration height $2h$ are defined as previously. In this case, the slit width w is effectively 0. This embodiment has found to have improved performance at higher frequencies.

Figure 12:
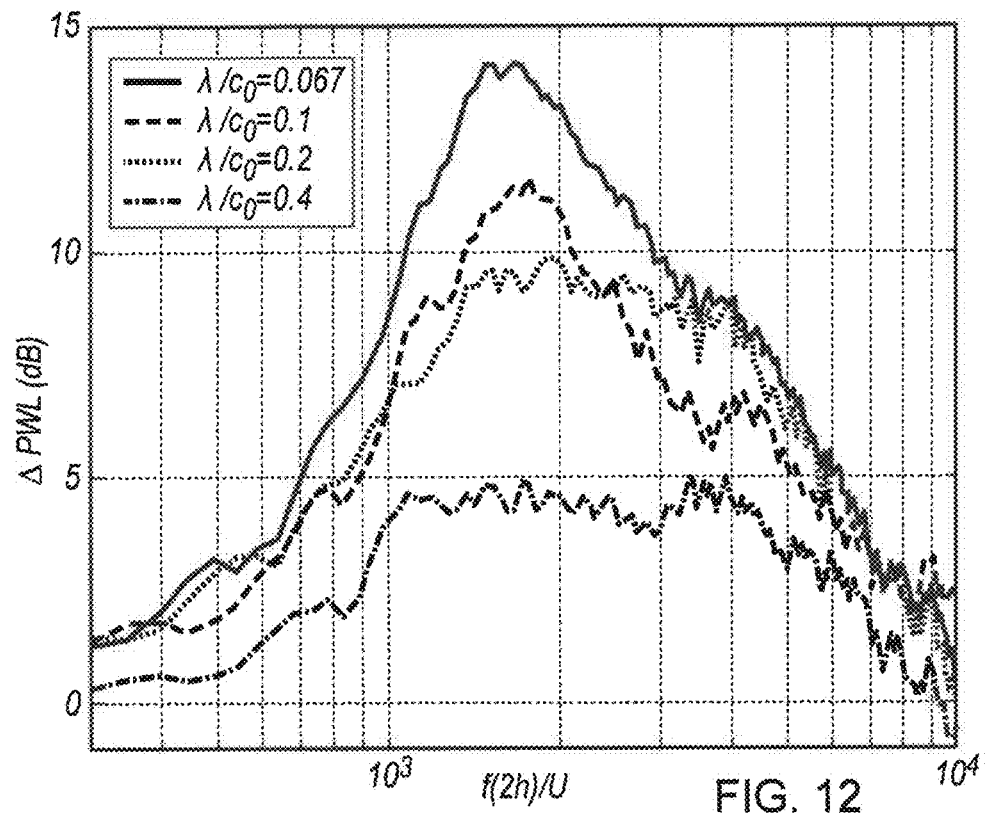
FIG. 12 is a graph showing relative reductions in perceived sound levels of the aerofoil of FIG. 1 having various serration wavelengths normalised for an aerofoil having a straight leading edge.
Figure 13:
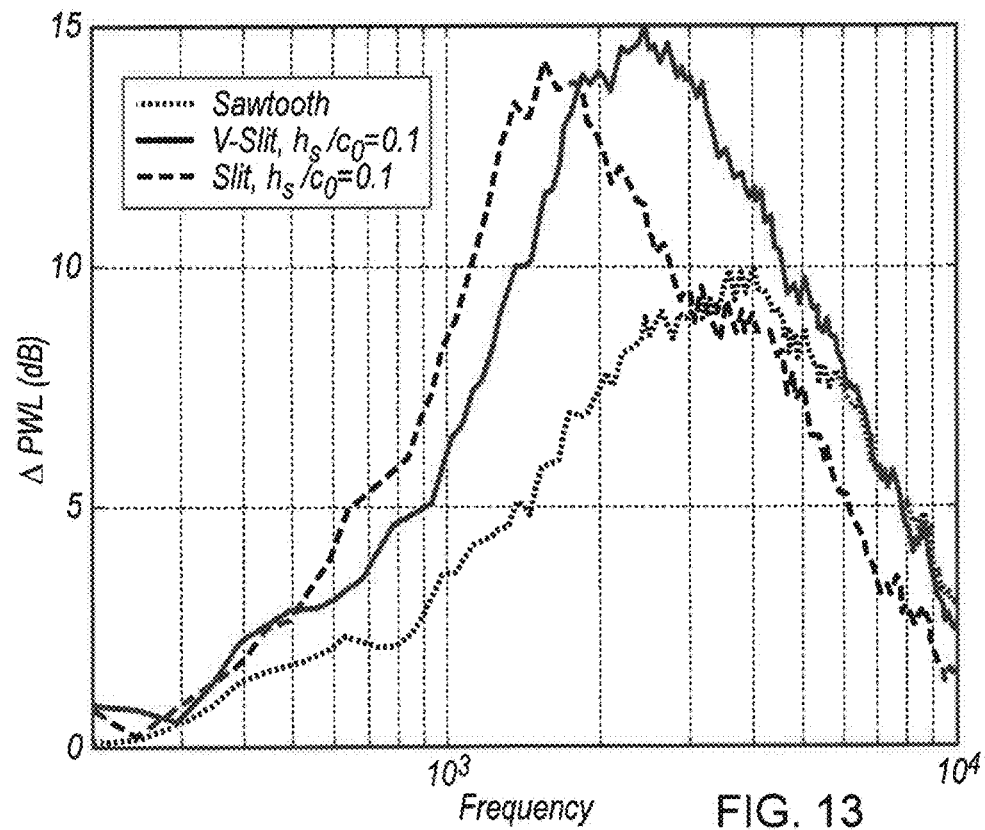
FIG. 13 is a graph showing relative reductions in perceived sound levels of the aerofoil of FIG. 3 having various serration wavelengths normalised for an aerofoil having a straight leading edge.
Figure 14:
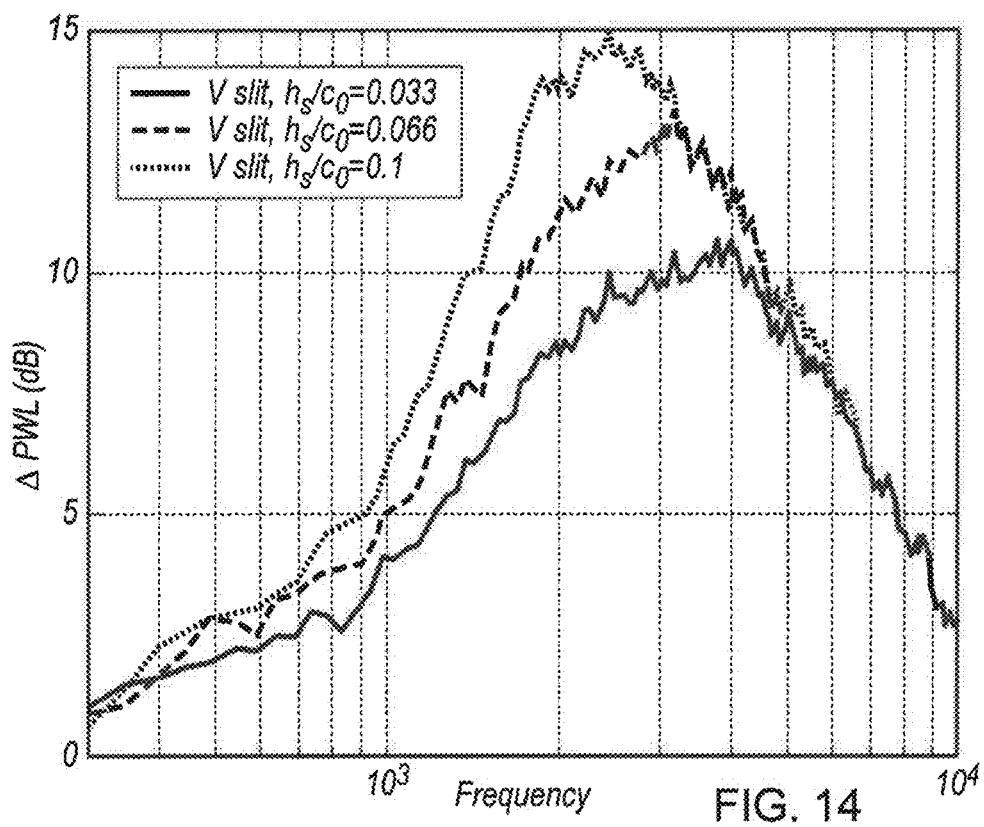
FIG. 14 is a graph showing relative reductions in perceived sound levels of further aerofoil having a leading edge profile as shown in FIG. 3 having various serration wavelengths normalised for an aerofoil having a straight leading edge.

FIGS. 12 and 13 show results from experiments conducted on leading edges K, L and M having leading edge profiles as shown in FIG. 3. Leading edge K had a height $h_s/c_0$ of 0.033, leading edge L had a height $h_s/c_0$ of 0.066, and leading edge M had a height $h_s/c_0$ of 0.1. Results from leading edge K compared to a saw-tooth leading edge and leading edge C are shown in FIG. 12. As can be seen, the perceived noise attenuation is greater at lower frequencies, which is desirable in many cases. As shown in FIG. 13, which compares leading edges K, L and M, noise attenuation is strongly dependent on the ratio of slot height $h_s$ to chord length $x_0$.

Figure 4:
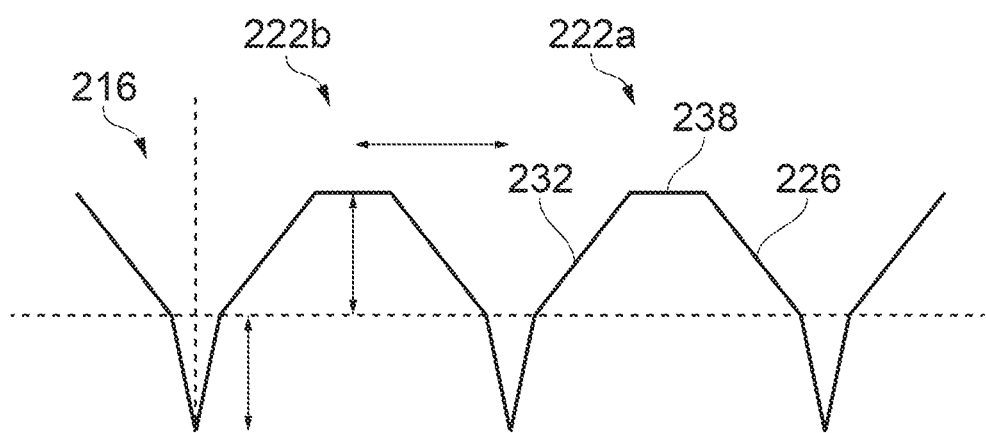
FIG. 4 is a schematic plan view of a leading edge of a third aerofoil in accordance with the present invention.

FIG. 4 shows a third leading edge 216 of a third aerofoil 110 in accordance with the present disclosure. The leading edge 216 comprises a similar profile to that of the leading edge 116 of FIG. 3, and so only differences shall be described. A first portion 226 of a first serration 222a is joined to a fourth portion 232 of a second serration 222b via a sixth portion 238 which extends in a spanwise direction generally normal to the in use airflow direction X, such that the apex of the leading edge 216 is flattened. It is thought that such an arrangement would be effective in providing noise reduction relative to prior leading edge arrangements.

Figure 5:
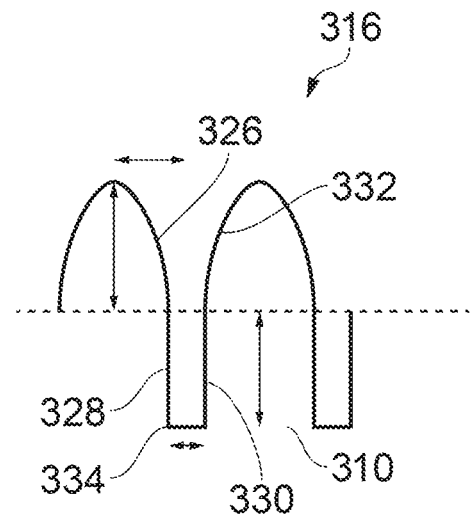
FIG. 5 is a schematic plan view of a leading edge of a fourth aerofoil in accordance with the present invention.

FIG. 5 shows a fourth leading edge 316 of a fourth aerofoil 310. The leading edge 316 is similar to that of the aerofoil 10 of FIG. 1, except that first and fourth portions 326, 332 having convex curvatures are provided, such that the first and fourth portions 326, 332 define a profile similar to part of a sine curve.

Figure 6:
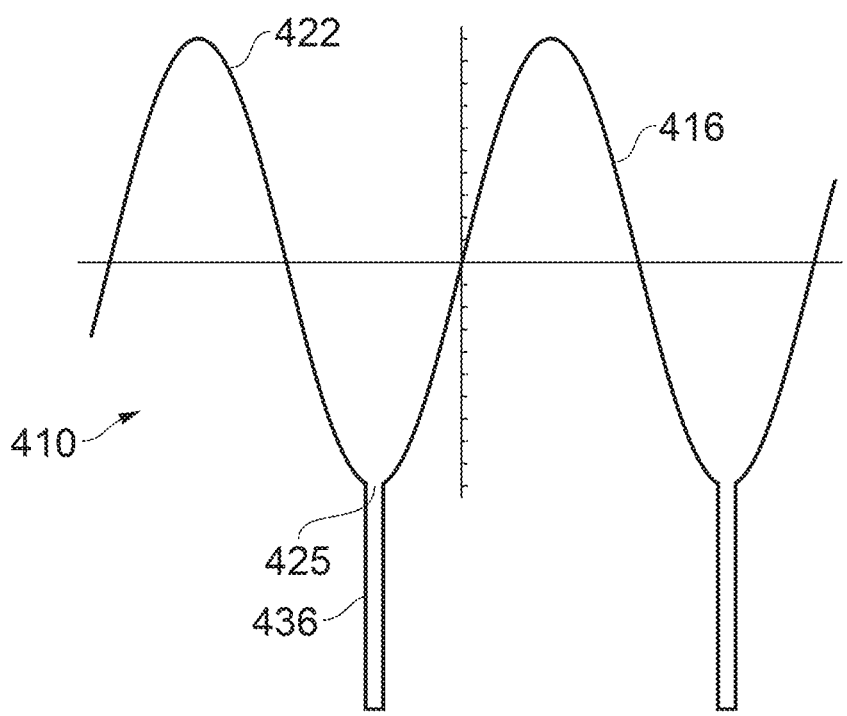
FIG. 6 is a schematic plan view of a leading edge of a fifth aerofoil in accordance with the present invention.

FIG. 6 shows a fifth leading edge 416 of a fifth aerofoil 410. The leading edge 416 is similar to that of the aerofoil 10 of FIG. 1, except that each serration 422 is defined by a leading edge profile corresponding to a sine wave function. Notches 436 are provided at a nadir 425 of each serration, i.e. at points on the sine function corresponding to −π/2 and 3π/2.

Figure 7:
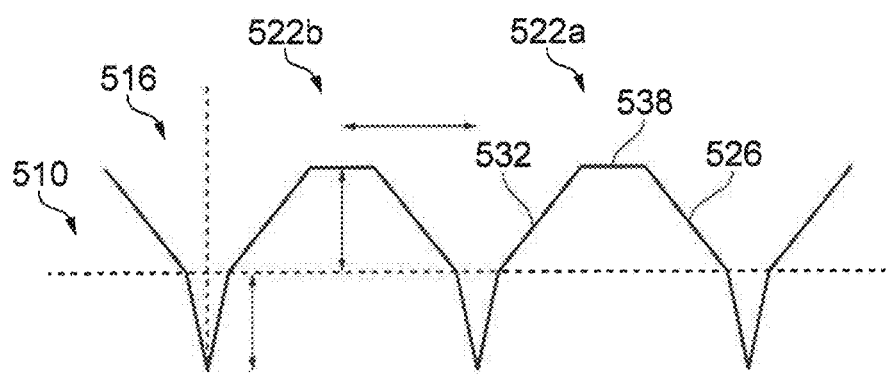
FIG. 7 is a schematic plan view of a leading edge of a sixth aerofoil in accordance with the present invention.

FIG. 7 shows a sixth leading edge 516 of a sixth aerofoil 510. The leading edge is similar to that of FIG. 1, except that the leading edge 516 comprises a generally spanwise extending sixth portion 538 which joins a first portion 526 of a first serration 522a to a fourth portion 532 of a second serration 522b. Such an arrangement provides improved leading edge strength compared to serrations with sharp leading edges.

Figure 16:
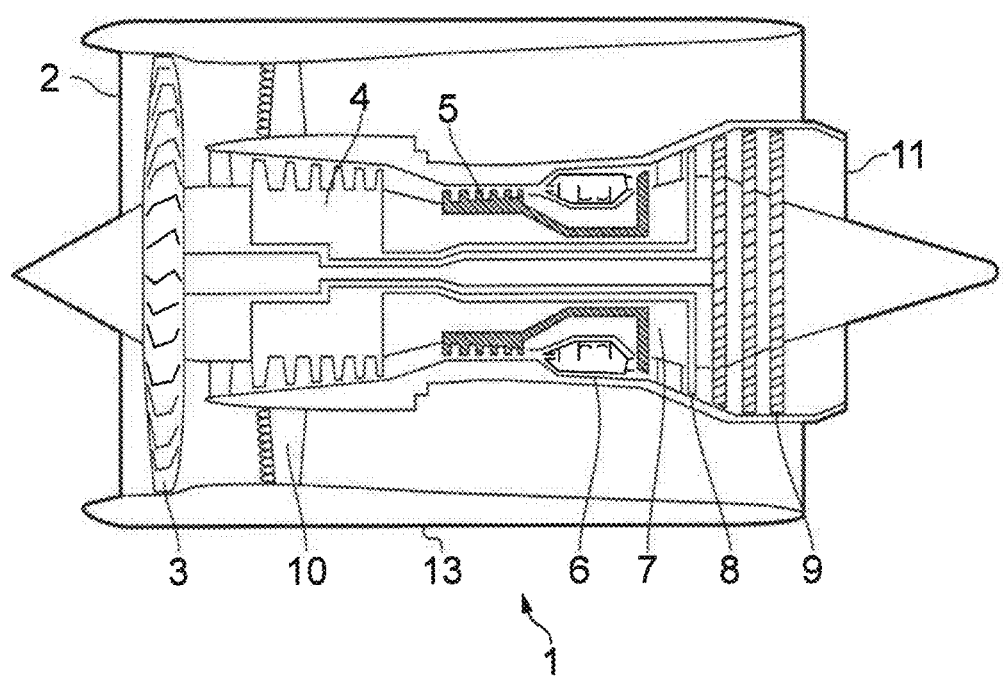
FIG. 16 is a cross sectional schematic of a gas turbine engine comprising an aerofoil in accordance with the present disclosure.

FIG. 16 shows a gas turbine engine 1 employing an aerofoil in accordance with the above disclosure. The engine 1 comprises, in axial flow series, an air intake 2, a propulsive fan 3, an intermediate pressure compressor 4, a high-pressure compressor 5, combustion equipment 6, a high-pressure turbine 7, and intermediate pressure turbine 8, a low-pressure turbine 9 and an exhaust nozzle 11. A nacelle 13 generally surrounds the engine 1 and defines both the intake 2 and the exhaust nozzle 13. Downstream of the fan, an outlet guide vane 10 is provided, which comprises an aerofoil as shown in FIG. 1. Due to the provision of the aerofoil having the leading edge profile in FIG. 1, noise generated by interaction of the fan efflux with the outlet guide vane 10 is reduced relative to prior arrangements.

It will be understood that the invention is not limited to the embodiments above-described and various modifications and improvements can be made without departing from the concepts described herein. For example, the invention could be employed in aerofoils of different parts of a gas turbine engine, different parts of an aircraft, or in non-aviation applications, such as wind turbines, marine propellers, industrial cooling fans, and other aerofoils in which noise is a consideration. The invention has been found to be effective for a wide range of aerofoil cross sectional profiles, and also for flat plate aerofoils.

Except where mutually exclusive, any of the features may be employed separately or in combination with any other features and the disclosure extends to and includes all combinations and sub-combinations of one or more features described herein.

The invention claimed is:

1. An aerofoil component defining an in use leading edge and a trailing edge, the leading edge comprising at least one serration defining an apex and a nadir, wherein the leading edge comprises a slot located at the nadir of each serration, the slot extending generally chordwise, wherein each serration comprises, in sequence in a spanwise direction extending from the apex:
   a rearwardly inclined, relative to an in use flow direction, first portion;
   a rearwardly inclined second portion joined with the rearwardly inclined first portion at a first internal angle ($\alpha$) relative to the rearwardly inclined first portion of between 90° and 180°;
   a forwardly inclined, relative to the in use flow direction, third portion, the second and third portions forming the slot; and
   a forwardly inclined fourth portion joined with the third portion at a second internal angle ($\beta$) relative to the forwardly inclined third portion of between 90° and 180°,
   and wherein (i) the rearwardly inclined second portion is joined with the rearwardly inclined first portion at an angle relative to the forwardly inclined third portion to form the slot, or (ii) the second and third portions are joined to one another at an angle by a fifth portion, the second, third and fifth portions defining the slot, the fifth portion extending in a generally spanwise direction, generally normal to the in use flow direction.

2. An aerofoil component according to claim 1, wherein the first and / or fourth portion comprises an angle relative to the in use flow direction of between 45° and 90°.

3. An aerofoil component according to claim 2, wherein the first and/or fourth portion comprises an angle relative to the in use flow direction greater than 50°.

4. An aerofoil component according to claim 1, wherein the at least one serration comprises a first serration and a second serration, and the first portion of the first serration is joined to a fourth portion of the second serration at the apex.

5. An aerofoil component according to claim 1, wherein the at least one serration comprises a first serration and a second serration, and the first portion of the first serration is joined to a fourth portion of the second serration via a sixth portion.

6. An aerofoil component according to claim 5, wherein the sixth portion extends generally normal to the in use flow direction.

7. An aerofoil component according to claim 1, wherein the second portion is joined to the third portion to form the slot.

8. An aerofoil component according to claim 1, wherein the second and third portions are joined to one another by a fifth portion, the second, third and fifth portions defining the slot.

9. An aerofoil component according to claim 8, wherein a spanwise length of the fifth portion is about 1 mm.

10. An aerofoil component according to claim 8, wherein at least one of the second and third portions extends generally parallel to the in use flow direction.

11. An aerofoil component according to claim 1, wherein at least one of the first, second, third and fourth portions comprise one of a convex curve and a straight edge.

12. An aerofoil component according to claim 1, wherein a chordwise distance between the apex and the nadir of each serration is at least twice the spanwise distance between apexes of adjacent serrations.

13. A gas turbine engine comprising an aerofoil component according to claim 1.

14. A gas turbine engine according to claim 13, wherein the aerofoil component comprises an outlet guide vane.

* * * * *